Aug. 4, 1953 E. M. O'NEILL 2,647,485
APPARATUS FOR PROPORTIONING LIQUID MIXTURES
Original Filed April 24, 1945 3 Sheets-Sheet 1
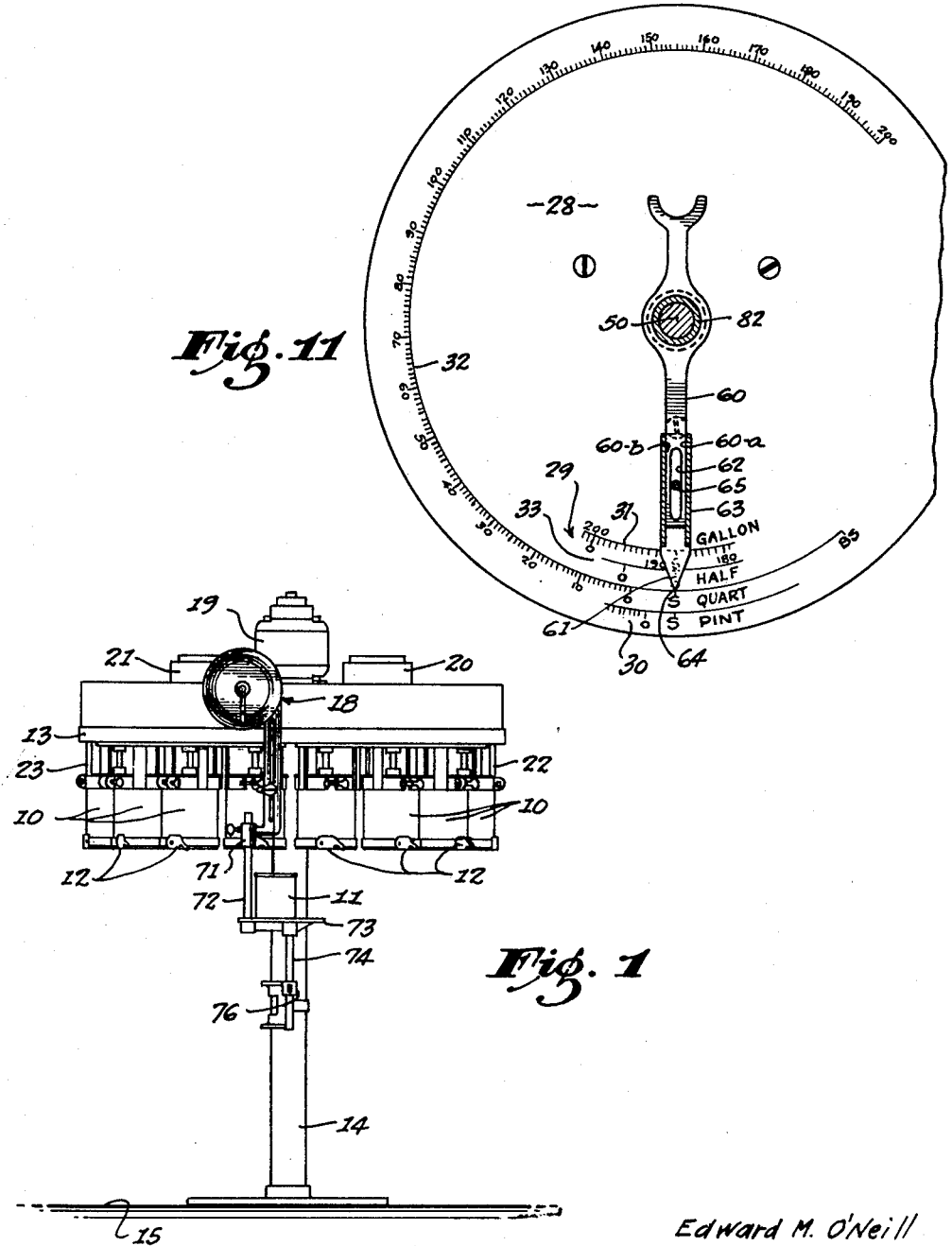
Edward M. O'Neill
INVENTOR
BY John Flam
ATTORNEY Aug. 4, 1953     E. M. O'NEILL     2,647,485
APPARATUS FOR PROPORTIONING LIQUID MIXTURES
Original Filed April 24, 1945     3 Sheets-Sheet 2
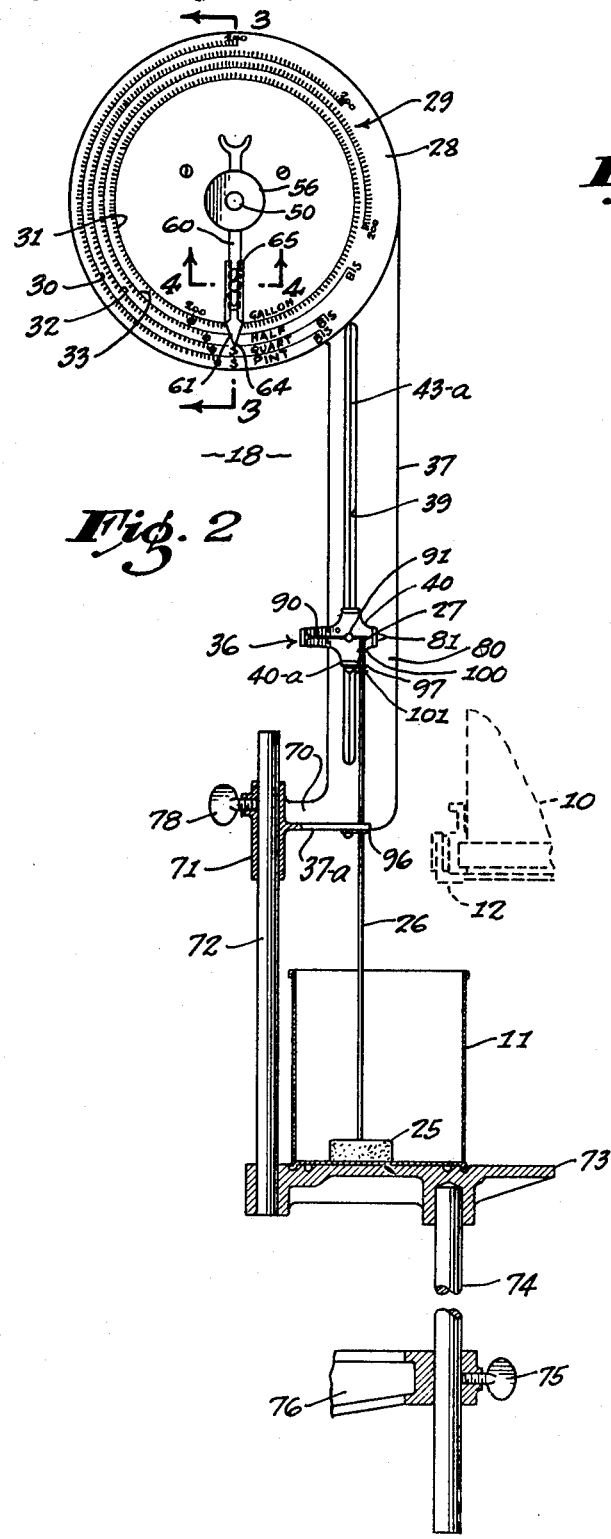
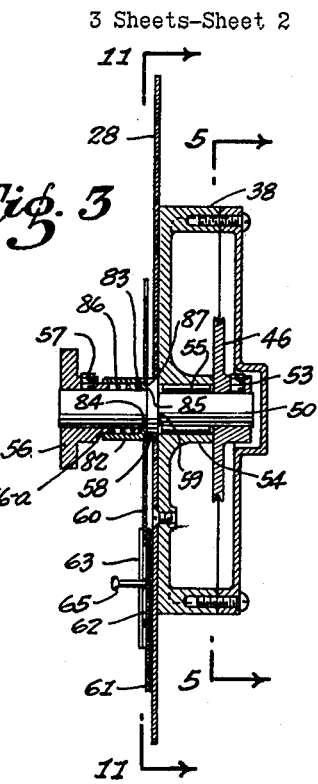
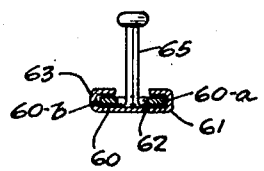
Edward M. O'Neill
INVENTOR
BY John Flann
ATTORNEY

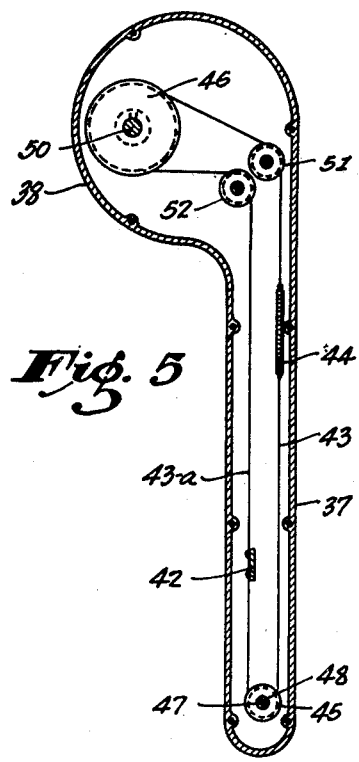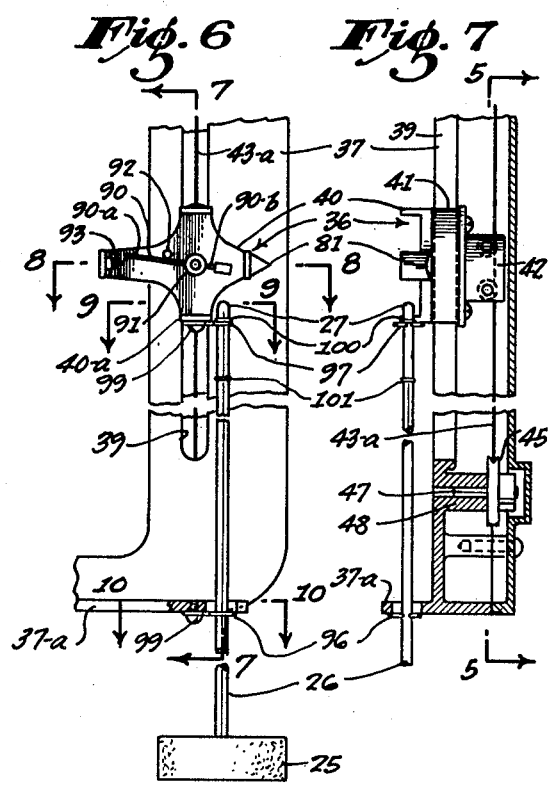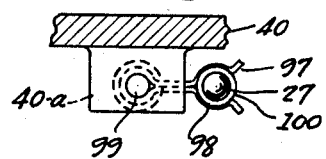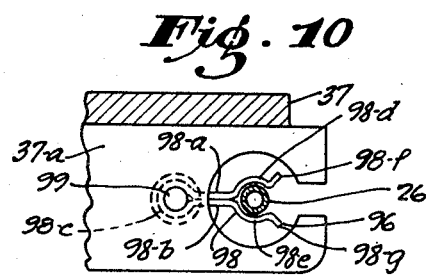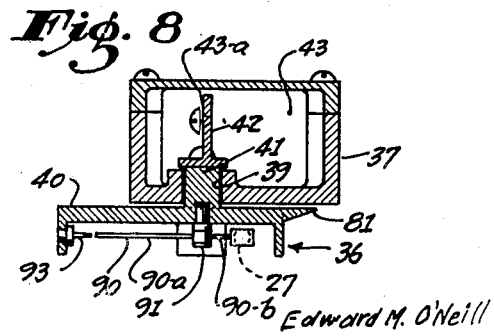

Patented Aug. 4, 1953

2,647,485

UNITED STATES PATENT OFFICE 2,647,485

APPARATUS FOR PROPORTIONING LIQUID MIXTURES

Edward M. O'Neill, San Francisco, Calif., assignor to Union Machine Company, San Francisco, Calif., a corporation of California Original application April 24, 1945, Serial No. 590,069. Divided and this application October 30, 1950, Serial No. 197,911

4 Claims. (Cl. 116—129)

1

This invention relates to gauging apparatus for accurately indicating when, during the operation of placing liquid in a container, a predetermined quantity or proportion has been added.

This invention discloses an improvement of the mechanism disclosed in my copending application Ser. No. 454,087, filed August 8, 1942, now Patent No. 2,399,291, and entitled "Liquid Level Indicator."

This application is a division of application Ser. No. 590,069, filed April 24, 1945, and entitled "Apparatus for Proportioning Liquid Mixtures."

In preparing a tint to match an existing color, such, for example, as in connection with repairing or touching up automobile bodies on which the finish has been damaged, it is common to mix suitable basic colors in proportions prescribed by a formula for the required tint. Such formulas are commonly expressed as scale readings which must prevail after the addition of the successive ingredients to the mixture.

It is an object of this invention to provide such an apparatus, embodying a scale arranged for accurate reading without the use of magnification, vernier arrangements, or the like.

It is another object of this invention to provide such an apparatus in which accurate positioning of the scale with respect to the container of the mixture is not required.

This invention possesses many other advantages, and has other objects which may be made more clearly apparent from a consideration of one embodiment of the invention. For this purpose there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

In the drawings:

Figure 1 is an elevation of a mixing machine incorporating the gauging apparatus of the invention;

Fig. 2 is an elevation on an enlarged scale, partly in section, of the gauging apparatus;

Fig. 3 is a vertical section on a further enlarged scale, taken as indicated by line 3—3 on Fig. 2;

Fig. 4 is a detail cross-section, taken as indicated by line 4—4 on Fig. 2;

Fig. 5 is a transverse section, taken as indicated by the lines 5—5 on Figs. 3 and 7;

2

Fig. 6 is an elevation, on an enlarged scale, of the indicating mechanism;

Fig. 7 is a vertical section, on an enlarged scale, taken as indicated by line 7—7 of Fig. 6;

Figs. 8, 9, and 10 are detail sections, taken as indicated by the correspondingly numbered lines on Fig. 6; and Fig. 11 is a detail section, taken as indicated by line 11—11 of Fig. 3.

Referring to Fig. 1, of the drawings, a mixing apparatus is shown of the type disclosed in a co-pending application filed in the name of Edward M. O'Neill on August 24, 1942, Serial Number 455,833, and entitled "Mixing Apparatus." This apparatus includes a plurality of cans or containers 10, containing different liquids or ingredients which may be required in a mixture formula. For instance, cans 10 may each contain paint, lacquer, or the like, of a different color. It is thus possible to produce a paint or lacquer mixture of a certain tint or shade of color by mixing portions of the paints in some or all of the cans 10 in accordance with a known formula.

For receiving the ingredients, a receptacle 11 is provided, suitably supported below the cans 10. Each of the cans 10 is provided with a valve 12 for accurately controlling the discharge of the contents of the can. Cans 10 are carried by a table 13, rotatably supported on a standard 14 which may rest on the floor 15. The arrangement is such that table 13 may be revolved manually to bring that can 10 having the desired color or ingredient immediately over receptacle 11. The valve 12 of this can is then opened to allow the proper quantity of the contents of the can to flow into receptacle 11, this quantity being indicated by the gauging apparatus 18 in a manner to be hereinafter described.

Means, including a motor 19, are provided for agitating the paint, or other ingredients, in the cans 10 before the mixing operation is started. Containers 20 and 21 are provided on the table 13 for holding liquids which flow more readily than paint and do not require agitation, such as a "thinner" or "dryer." Liquid from the respective containers 20, 21 is discharged through valved pipes 22, 23 which are each placed between a pair of cans 10 and terminate adjacent the bottoms of these cans.

The gauging apparatus 18 includes a float 25 having a stem 26 (Figs. 2 and 6). The float is intended to be freely movable in accordance with the level of the liquid in the receptacle 11, so that the position of the upper end 27 of the stem 26 will accurately correspond to the liquid level. To ensure accuracy, the float 25 is made of very light material, such as balsa wood, and the stem 26 is a thin aluminum tube closed at its upper end 27.

A dial 28 is provided to gauge the rise of the float 25, in proportion to the height of the receptacle 11, and is mounted above the receptacle 11. The dial 28 carries a plurality of scales 29 having respectively indicia for use with receptacles 11 of different sizes. To provide scales of such length as to be readily readable accurately without the need of magnification or verniers, the scales are in the form of concentric graduated circular arcs.

Since such receptacles are in general of standard dimensions for various capacities, the various scales 29 serve to indicate, upon use with appropriate receptacles, definite quantities such as pints, quarts, or gallons. Since such receptacles are of progressively greater heights for greater capacities, there are provided four scales 29, for example, and of progressively increasing lengths. Thus, the shortest scale 30 is for a pint size receptacle, the longest scale 31 is for a gallon receptacle, and the scales 32 and 33 of intermediate lengths are respectively for quart and half-gallon receptacles.

However, it is to be understood that the apparatus is not limited to use with definite sized receptacles, the only limitation being that the height of the receptacle be greater than the length of the scale to be used. Thus, when a very small amount of a given tint is needed, a half-pint or less can be readily prepared by using the pint scale and a receptacle, such as 11, of small diameter or cross section and of sufficient height. Similarly, other desired quantities can be prepared by using either the quart, half-gallon or gallon scales with a receptacle of suitable cross section and suitable height.

An indicator mechanism 36 (see Figs. 2, 6, 7, and 8) is provided to assist in accurately determining the arrival of the float 25 at a point corresponding to a definite scale divison. This indicator 36 is slidable in a vertical direction along the face of a hollow tubular member or column 37. As shown in Figs. 3 and 5, the column 37 has an offset circular portion or head 38 at its upper end upon which is mounted the dial 28. By offsetting the dial 28 in this manner, the overall height of the apparatus is reduced.

As best shown in Figs. 6, 7, and 8, the column 37 is provided with a vertically extending slot 39 opening through its face. The indicator 36 comprises a body member 40 having a lug 41 extending through the slot 39 and carrying clamp means 42 by which the indicator is secured to a light cable 43 having a portion 43-a behind the slot 39 and movable lengthwise thereof, and which supports and adjustably positions the indicator 36.

As shown in Fig. 5, the ends of the cable 43 are joined by a tension spring 44 to maintain the cable 43 as a loop tensioned about a lower idler sheave 45 and an upper driving sheave 46.

As clearly shown in Fig. 3, the drive sheave 46 is provided with a steep-sided V-groove for accommodating the cable 43, the spring 44 being of sufficient tension to prevent slippage between the cable 43 and the sheave 46. By thus preventing any lost motion between the indicator 36 and the means indicating the position thereof on scale 29, accurate indications of the quantity in the receptacle 11 are ensured.

As shown in Fig. 7, the sheave 45 is rotatably supported by a pin 47 secured in an inwardly projecting boss 48 formed in the front wall of the column 37. The drive sheave 46 is fixed on a shaft 50 which is co-axial with the scale 29, idler sheaves 51 and 52 being provided approximately to guide the cable to the sheave 46.

As shown in Fig. 3, the sheave 46 is secured on the shaft 50 near one end thereof, as by a set screw 53. The shaft 50 is rotatably supported in a hub or boss 54, formed on the front wall of column head 38, by a number of rolling bearing elements 55. The shaft 50 extends out of the head 38 and has an operating knob 56 secured on its outer end, as by a set screw 57. Rotation of the shaft 50 by means of the knob 56 serves to adjust the position of the indicator 36 in an obvious manner. An enlarged portion 58 on shaft 50 forms a shoulder 59 which engages the face of the head 38 and co-operates with sheave 46, which engages the inner end of hub 54 to restrain the shaft against axial movement. The frictional resistance of the parts serves to maintain the indicator 36 in adjusted position.

A dial hand 60 is carried by the shaft 50 for rotation therewith for co-operating with the scale 29 to indicate the setting of the indicator mechanism 36. To facilitate accurate setting of the hand 60, it is provided with an index 61 which is radially adjustable so as to be in close relationship with any one of the scales 30, 31, 32, and 33. As shown in Figs. 2 and 11, the index 61 is positioned for co-operation with the scale 32 for a quart sized receptacle.

The outer end portion of the hand 60 has a radially extending slot 62 and sides 60-a and 60-b parallel therewith. The index 61 has a portion 63 of flattened C-shaped cross section which closely embraces the outer end portion of pointer 60 (see Fig. 4) so as to be freely slidable therealong. The index 61 has a pointed end 64 which co-operates with the chosen scale, and a pin 65 projecting through the slot 62 by means of which the pointer may be adjusted.

The entire gauging apparatus 18 is supported above the receptacle 11 by a lateral extension 70 formed on the lower end of the column 37, and having a hollow boss 71 slidable over a vertical rod 72 fixed to a small platen or table 73 which supports the receptacle 11. The table 73 is mounted on a post 74 secured as by a set screw 75 in an arm 76 clamped to the pedestal 14. By loosening the set screw 75, the table 73 may be suitably positioned with respect to the containers 10 to receive paint, or the like, therefrom without splashing or spilling.

The gauging apparatus 18 may be secured in the proper position on rod 72 by a set screw 78 threaded through the boss 71. However, this position is not critical, nor does it necessarily need to be changed to permit use of receptacles 11 of different capacities, since means are provided to give a zero indication on the scale 29 for various positions of the receptacle 11. The only requirement is that the apparatus 18 be positioned sufficiently far above the receptacle 11 to allow the indicator 36 to be moved through a distance corresponding to a full scale reading. To facilitate such positioning, a mark 80 (Fig. 2) is provided on the face of the column 37 for co-operation with a marker 81 formed on the indicator body 40. For receptacles 11 of gallon capacity, the apparatus must be positioned with the marker 81 at or below the mark 80 when the float 25 rests on the bottom of the receptacle to ensure a full reading of the gallon scale 34.

The need of accurately positioning the apparatus 10 with respect to the receptacle 11 is avoided by making the dial hand 60 angularly adjustable on the shaft 50. Thus, a sleeve 82 (see Fig. 3) has the hand 60 secured thereon in any preferred manner and has an end portion 83 adjacent the dial of reduced inner diameter bearing on the shaft 50 and forming an inner shoulder 84. The opposite end portion of the sleeve 82 rotatably and slidably rests on a reduced portion 56-a of the hub of the knob 56. A light compression spring 86, confined between the end of the hub portion 56-a and shoulder 84, urges sleeve 82 axially of shaft 50 so that the outer end 85 of the sleeve engages the adjacent face 87 of the enlarged shaft portion 58. In this way, the hand 60 is frictionally constrained to rotate with shaft 50 and hence in accordance with the movement of the indicator 36, but may be rotated independently thereof as desired, for example, by the pin 65. In this way, the index 64 is both radially and angularly adjustable of the scale 29.

As disclosed in said co-pending application, the indicator 36 includes a pointer 90 pivoted at 91 on the body member 40 (see Figs. 6 and 8). The pointer 90 has a long indicating portion 90-a and a short actuating portion 90-b which is made sufficiently heavy to overbalance the indicating portion 90-a. Thus, with the indicating portion 90-a extending to the left, as in Fig. 6, the pointer 90 turns clockwise on its pivot 91 until checked by the stop pin 92 on the body 40.

A fixed pointer or mark 93 is mounted on the body 40 for co-operating with the pointer 90 to indicate a definite position thereof. It will be apparent that a barely perceptible movement of the actuating end 90-b of the pointer 90 will result in a substantial and readily observable movement of the indicating end 90-a with respect to the mark 93. Such movement is arranged to occur with a change of the liquid level or quantity under consideration. Thus, the upper end 27 of the float stem 26 is arranged to engage the actuating portion 90-b of the pointer 90 and to swing the pointer 90 counter-clockwise about pivot 91 upon upward movement of the float 25, referring to Fig. 6. In this way, arrival of the float at a definite elevation is accurately indicated by the alignment of the pointer 90 with the mark 93.

It is important that the float be guided adequately to ensure its responding freely to changes in the liquid level. Thus, it is desirable to guide the stem 26 at points spaced apart as far as possible. Thus, one of the guide means for the stem 26, indicated at 96, is mounted at the lower end of the column 37. Since only the final upward movement of the float for a given liquid level is of any significance, the other guide means 97 for the float stem is mounted on the indicator body 40, means being provided to maintain the float stem in guiding relation with the means 97 for all adjusted positions of the indicator 36.

As clearly shown in Figs. 9 and 10, the guide means 96 and 97 are substantially identical, and each includes an element 98 formed of light spring wire bent to provide a pair of parallel normally contacting fingers 98-a, 98-b, joined by a loop or eye 98-c. A machine screw 99, passing through the eye 98-c and threaded into a lug 37-a or 40-a, as the case may be, serves to secure the element 98 in place. The free ends of the fingers 98-a and 98-b are provided with arcuate portions 98-d and 98-e, which co-operate partly to encircle the float stem 26, the parts being so proportioned that the stem 26 is freely slidable through the guide, but is quite accurately guided axially. The space between the ends of the arcuate portions 98-d and 98-e is such that a slight lateral force, acting towards the right (Figs. 9 and 10) on the stem 26, forces the arcuate portions apart sufficiently to permit removal of the stem from the guide. The stem 26 may be replaced by forcing it in the opposite direction. To facilitate placement of the stem in the guides, the arcuate portions are provided with diverging tails 98-f and 98-g. It is desirable to be able to remove the float 25 and stem 26 to facilitate cleaning when necessary.

To retain the stem 26 in the guide 97 for all adjusted positions of the indicator 36, an abutment 100, which may conveniently be a spring ring, is provided on the stem 26 near its upper end 27 (see Figs. 6 and 9). As shown in Fig. 9, the outside diameter of the ring 100 is such that the ring cannot pass through the space normally provided by the guide 97. In this way, the float 25 and the stem 26, when not supported by liquid, hang from the guide 97 and move up and down with the indicator 36 as it is adjusted. At the same time, the stem 26 and float 25 are free to rise in response to a rise in liquid level and actuate the pointer 90 as previously described. A second similar abutment 101, spaced below the guide 97, serves to prevent excessive upward movement of the stem 26 which might damage the pointer 90.

In using the gauge, it is positioned at such a distance above the receptacle 11 that, in the lower position of the indicator 36, the float 25 rests on the bottom of the receptacle and the indicator has sufficient movement upwardly from this position to cause the hand 60 to traverse the scale corresponding to the capacity of the receptacle. This position is not at all critical, due to the previously described adjustment provided between the indicator 36 and the hand 60.

Assuming that a quart size receptacle 11 is to be used, the index 64 is first adjusted radially to facilitate accurate reading of the quart scale 32, as shown in the drawings. The knob 56 is then rotated so to position the indicator 36 that the float 25 rests on the bottom of the receptacle 11, with pointer 90 and mark 93 aligned. The hand 60 is then adjusted angularly on the shaft 50 to cause the index to point to the starting mark S on the scale 32. It will be apparent that this adjustment of the hand 60 permits considerable latitude in the position of the float 25.

Due to irregularities in the bottom of the receptacle 11, it is not desirable to start proportioning the mixture with the float thereon as a starting point, since this might cause serious inaccuracy in the amount of the first ingredient. Accordingly, it is proposed to add as a first ingredient some liquid which has no effect on the final tint, such as a paint thinner or dryer, from the container 20 or 21. This raises the float 25 clear of the receptacle bottom and provides an accurate starting point from which to determine the amounts of the essential ingredients. For this purpose, the scales are each provided with a zero mark corresponding to a position of the float 25 somewhat above the bottom of the receptacle 11. The use of some light liquid in this manner serves not only to ensure the accuracy of the mixture, but, since it remains on top of the colored pigments subsequently added, serves to maintain the float out of contact with the colors. Thus, at the conclusion of the mixing operation, such liquid, with the float 25 suspended therein, is on top of the mixture, so that the float does not require cleaning, but may be removed and merely wiped dry.

After initial adjustment of the index 61 to the S mark at the proper scale, with the float at the bottom of the receptacle 11, the knob 56 is rotated to bring the index 61 to the zero mark, correspondingly raising the indicator 36. The thinner, or other appropriate liquid, is then poured into the receptacle 11 until the float 25 is raised sufficiently again to align pointer 90 with the mark 93. The proportioning of the mixture now starts.

Each of the scales 30—33 on the dial 28 is graduated from zero to 200 in the manner of the scale 32, as shown in Fig. 11. Thus, each scale division equals one-half of one per cent of the total mixture; and simple addition would enable a user successively to set the indicator properly to determine the percentages of the ingredients in a known mixture.

However, such mixtures are usually prepared in accordance with a formula which lists the several ingredients required, with the scale reading which is to obtain after the addition of the proper amount of each ingredient.

As an example, such a formula, utilizing in this case only four ingredients out of the total provided by the machine of Fig. 1, may read as follows:

No. 1—151
2—166
6—167½
15—200

To comply with such a formula, that can 10 which carries ingredient No. 1 is brought over receptacle 11 by appropriate rotation of table 13. Then, after preliminary setting of the apparatus as heretofore described, the index 61 is moved to scale division 151 on the scale 32 which corresponds to the size of the receptacle 11. The ingredient No. 1 is then discharged from the container 10 by means of the valve 12 thereon into receptacle 11 until the pointer 90 is aligned with the mark 93. Now the index 61 is moved to division 166, and ingredient No. 2 is discharged from appropriate can 10 into receptacle 11 until the point 90 is again aligned with the mark 93. Then the index 61 is moved to a position midway between divisions 167 and 168, and can 10, corresponding to ingredient 6, is used as a source of supply until pointer 90 again aligns with the mark 93. Lastly, index 61 is moved to division 200, and ingredient 15 is added to the mixture until the pointer 90 again aligns with the mark 93. The receptacle 11 is now full, and can be used for reproducing the color represented by the formula.

Some types of ingredients which it may be desired to mix, for example baking synthetic enamel, require a much greater amount of thinner than that provided by the rise of the float from the S to the zero mark. Accordingly, a mark BS is provided on the pint, quart, and half gallon scales spaced a greater distance from the zero mark to permit the addition of such larger amounts of thinner. This requires the use of a quart size receptacle for a pint of such enamel mixture and correspondingly larger receptacles for a quart or half gallon mixture. A gallon is never mixed, since it would overflow the receptacle.

The inventor claims:

1. In a scale and pointer mechanism: a rectilinearly movable indicator member, a rotatable shaft, coupling means for moving said member only in accordance with the angular movement of said shaft, a scale member, a pointer co-operating with said scale member and rotatably mounted on said shaft, and means frictionally coupling said pointer for rotation with said shaft whereby said pointer is adjustable with respect to said shaft to alter the scale reading for a given position of said movable member.

2. In a scale and pointer mechanism for desirably positioning a movable member, a shaft, bearing means rotatably supporting said shaft, means for moving said member in accordance with the angular movement of said shaft, a scale member, means forming a pair of spaced shoulders on the shaft, a pointer co-operating with said scale member, means rotatably mounting said pointer on said shaft between said shoulders, and spring means confined between said mounting means and one of said shoulders urging said mounting means into frictional engagement with the other shoulder, whereby said pointer is adjustably coupled for rotation with said shaft.

3. In a scale and pointer mechanism for desirably positioning a movable member and including a rotatable element for moving said member, means providing a plurality of radially spaced arcuate scales with graduations extending at least partly about said element, a pointer mounted on said element, means for adjusting said pointer radially for co-operating with a chosen scale, and means for adjusting the pointer angularly on said element to alter the scale reading for a given position of said movable member.

4. In a scale and pointer mechanism: a rectilinearly movable indicator member; a rotatable shaft; means coupled to said shaft for positioning said movable member only in accordance with the angular position of said shaft; manually operable means for adjusting the angular position of said shaft; a scale member; a pointer cooperating with said scale member and rotatably mounted on said shaft; and means frictionally coupling said pointer for rotation with said shaft for rotation with said shaft, said frictional coupling permitting adjustment of said pointer independently of said shaft to alter the reading of said pointer with said scale member for a given position of said movable member.

EDWARD M. O'NEILL.

References Cited in the file of this patent

UNITED STATES PATENTS

| Number | Name | Date |
|---|---|---|
| 859,210 | Dixon | July 9, 1907 |
| 1,809,525 | Moran | June 9, 1931 |
| 2,277,699 | Guibert et al. | Mar. 31, 1942 |

FOREIGN PATENTS

| Number | Country | Date |
|---|---|---|
| 27,519 | Great Britain | of 1912 |